Feb. 26, 1935.    R. A. WITTMANN ET AL    1,992,340
AIR CONDITIONER
Filed Aug. 11, 1934    2 Sheets-Sheet 1

Inventors:
Robert A. Wittmann,
Robert G. Guthrie,
By Walter M. Fuller
Atty

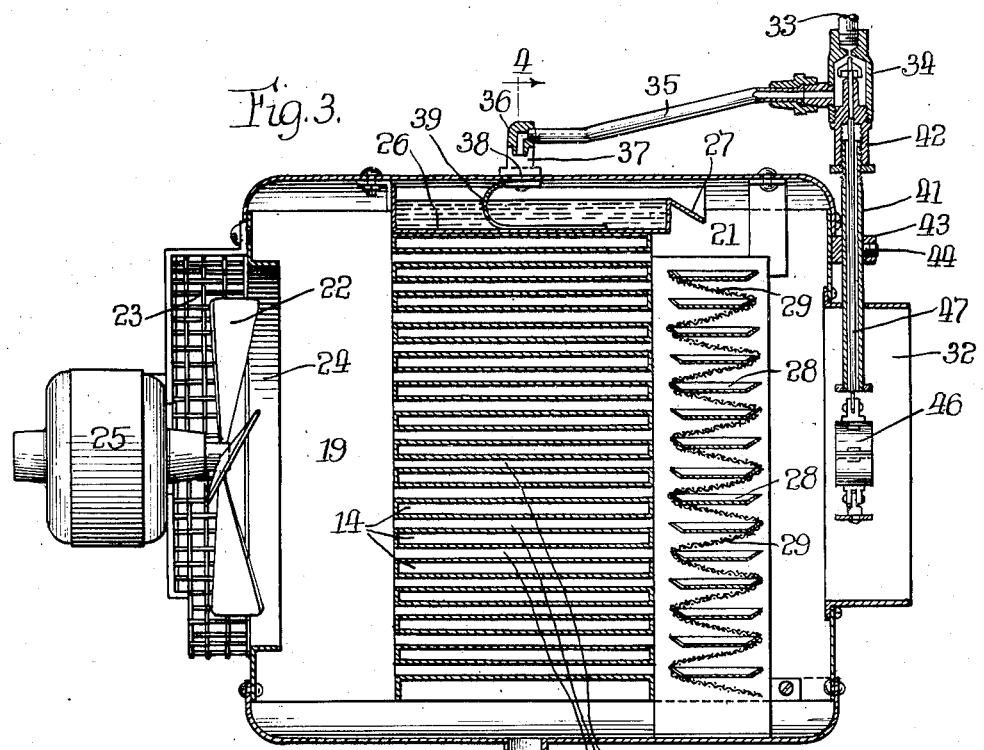
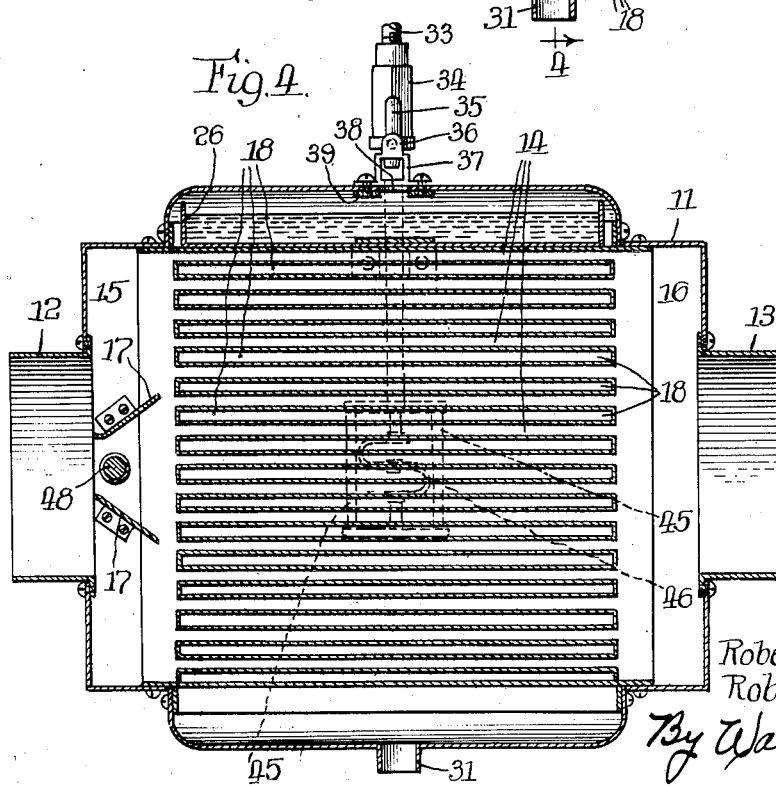

Patented Feb. 26, 1935

1,992,340

UNITED STATES PATENT OFFICE 1,992,340

AIR CONDITIONER

Robert A. Wittmann and Robert G. Guthrie, Chicago, Ill., assignors to Peoples Gas By-Products Corporation, Chicago, Ill., a corporation of Illinois Application August 11, 1934, Serial No. 739,372

5 Claims. (Cl. 257—138)

Our invention concerns certain features of novelty and advantage in appliances for heating and humidifying air before it is delivered to the rooms or building, whereby a desirable degree of atmospheric moisture is maintained at all times.

Means for heating and humidifying air employing a fan to create the current of air, suitable air-heating means, and a spray of water or other appropriate moisture-supplying means are old, but our new construction has certain structural and functional advantages not heretofore availed of.

In the devices of the prior art, it has been an important matter to so regulate the apparatus as to maintain the room temperature substantially constant and the humidity of the air practically unchanging.

Such an appliance does not entirely satisfactorily fill the ordinary needs and requirements so well as our new apparatus does which permits the room humidity to vary throughout substantial limits, being least when the outside temperature of winter is low and greater when the external temperature is high, thus maintaining a maximum relative humidity in the living quarters without undue condensation or frosting on the outside walls or windows.

Our invention, therefore, has reference to a novel air-conditioning apparatus of the humidifying type involving a new method of automatic humidity control, a special object of such invention being to provide a compact, quiet, inexpensive humidifier of the economizer type which requires a minimum of attention.

A further purpose of the invention is to supply an automatic control for a humidifier which will of itself regulate the relative humidity in the air-conditioned rooms close to the so-called comfort effective temperature without undue or excessive condensation on the outside walls or window panes, and, this humidity may vary from, say, 35% relative humidity when the outside temperature is 0° F. to 55% relative humidity when the external temperature is 65° F. without manual adjustment of the apparatus.

A still further aim of the invention is to extract heat from the flue-gases of the building heating-plant to maintain a substantially-constant predetermined temperature of the flue-gases flowing into the stack on all installations and also to utilize the heat of the flue-gases for humidification and any in excess of that needed for such requirement for heating purposes.

In order to enable those skilled in this art to understand the invention fully, both from structural and functional standpoints, in the accompanying drawings, froming a part of this specification and to which reference should be had in connection with the following detailed description, a present preferred embodiment of the air-condtioner has been illustrated in detail, and, for simplicity, like reference numerals have been employed to designate the same parts throughout the several views.

In these drawings:—

Figure 3 is a vertical, longitudinal section on line 3—3 of Figure 2; and

Figure 4 is a vertical cross-section on line 4—4 of Figure 3.

Figure 1:
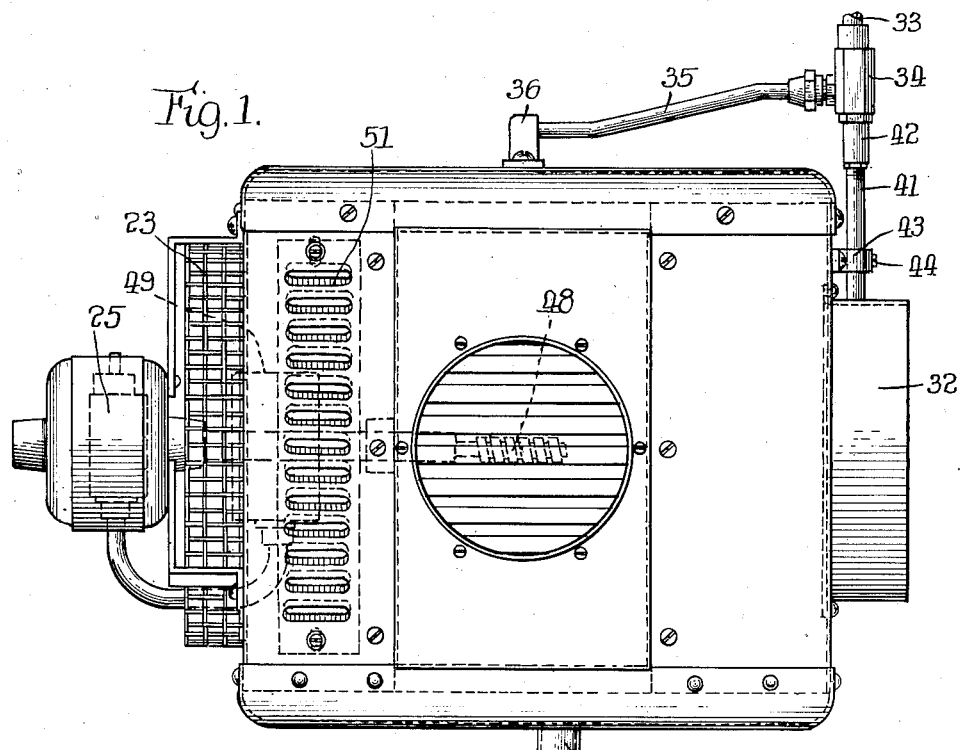
Figure 1 is a side elevation of the novel and improved air-conditioner.
Figure 2:
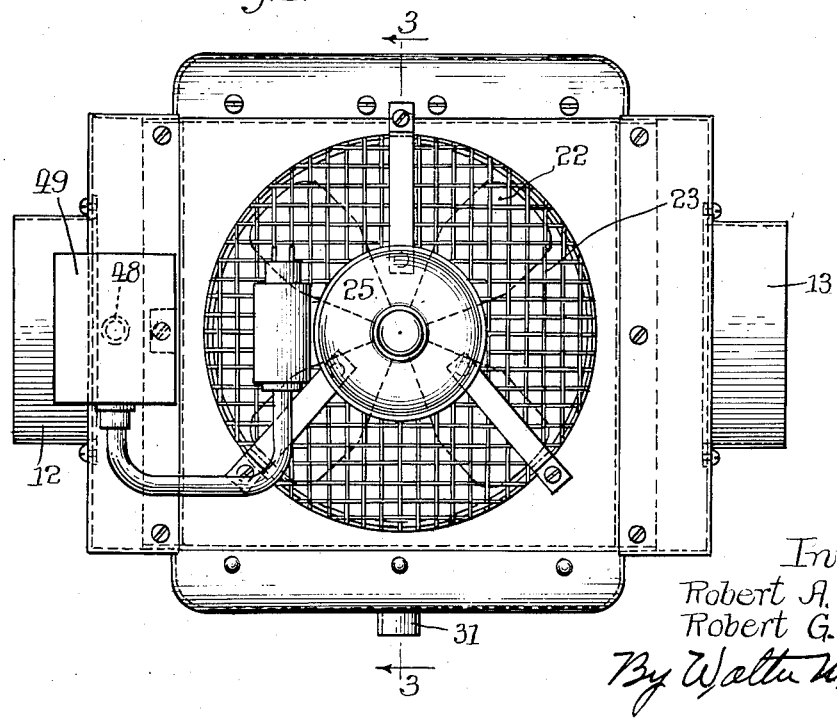
Figure 2 is an end elevation of the same.

Referring to these drawings, it will be perceived that the new apparatus involves a sheet-metal casing or housing 11 of appropriate form or shape having an inlet conduit or collar 12 at one side and a discharge collar or conduit 13 at the opposite side, these two connections being adapted for mounting the appliance in the flue or smoke pipe connecting the furnace with the stack or chimney, whereby advantage may be taken of the heat of such hot discharging gases which would otherwise escape and be lost.

This improved air-conditioner is intended to be used in association with a furnace or heater equipped with a gas, oil, or equivalent burner which is automatically rendered intermittently or discontinuously operative by a thermometer or thermostat appropriately located in the room or rooms, the air of which is to be conditioned by this device, but our new apparatus is not necessarily limited to this particular employment and it may be otherwise heated as occasion indicates is desirable.

Internally, the new device is constructed out of sheet-metal to provide a number of shallow, parallel, spaced, hot-gas passages 14 joining the chamber 15, inside of the casing and with which the inlet-pipe 12 connects, with a similar chamber 16 at the opposite side of the structure and directly associated with the discharge or delivery pipe 13.

In order to cause the hot combustion gases to flow through all of these passages comparatively evenly or uniformly, a pair of diverging deflectors 17, 17 are desirably located in space 15, as is clearly shown in Figure 4.

Arranged at right angles to the heating passages 14 there are intervening or alternating air-passages 18, 18, as presented in Figures 3 and 4, connecting a plenum-chamber 19 with a humidifying and mixing chamber 21, it being clear that, as the air flows through the narrow ducts 18 between the heated channels 14, the air will be adequately heated or raised in temperature, the described construction constituting an efficient heat-exchanger.

In order to force or drive the air through the appliance, a fan 22, suitably shielded by an encasing screen or guard 23, is located in or at an opening 24 in a wall of chamber 19, the fan being operated by an electric-motor 25 supported in any approved manner in the position shown.

Water for the performance of the air-moistening function is initially or preliminarily heated in a shallow pan 26 resting on the top metal wall of the uppermost hot-gas passage 14, such container at the upper part of chamber 21 having a spillway 27 which delivers the water overflowing from the pan to the top of a humidifying structure comprising a series of suitably-supported, vertically-separated, shallow pans 28, 28 associated with a zigzag or serpentine wire-screen 29 in the manner depicted in Figure 3, whereby an edge of a pan is located in each bend of the screen.

The construction is such that the water overflows from the supply-pan 26 into the uppermost pan 28 from which it in turn overflows onto the screen down which it trickles and through which it may pass into the next pan from which it flows over onto the next lower section of the screen, and so on.

In this way a cascade or cataract of water is provided in the path of the air flowing through the appliance, whereby the air absorbs a proper supply of moisture to give it a correct degree of humidity, the excess of water, if any, being discharged to the sewer through a drain 31 located at the bottom of the encasing housing 11, the conditioned air leaving the apparatus through a delivery flue or collar 32 from which it is conveyed, by means not shown, to the room or rooms whose air is to be modified or affected thereby.

Pan 26 is of such size and so related to the heating capacity of the appliance that the water fed or delivered therefrom to the humidifier 28, 29 is of a temperature substantially the same as the wet-bulb temperature of the heated air as it leaves the ducts or passages 18 and enters the humidifying or mixing chamber 21, thus assuring that the reduction in temperature of the air, due to a portion of its heat being employed to vaporize the water of the cascade to effect the desired degree of humidification, shall be only such as to effect that result and not that in addition necessary to produce the initial rise in water temperature.

The amount of water fed to the apparatus for humidifying purposes is not governed by a humidostat, as has been customary, but rather controlling the amount of adiabatic cooling of the air in passing through the humidifying stage, or, in other words, by controlling the dry-bulb depression during this action by regulating the dry-bulb temperature of the heated and humidified air as it leaves the appliance and before it becomes mixed with the air of the room or rooms.

To this end, the following cooperating instrumentalities are employed: A pipe 33 is connected to the city water main or to any other source of water supply and such pipe, through a needle-valve 34, is joined to a pipe 35 having a downwardly-directed discharge-nozzle 36 supported on a bracket 37 mounted on the top sheet-metal wall of the air-conditioner, the latter having an opening 38 directly beneath the nozzle and over the pan 26, whereby the nozzle delivers its water through the hole into the pan in a manner so that its action may be subject to observation.

In order to prevent the water-pan 26 from vibrating, due to the rotation of the fan, and also to hold the bottom of the pan in good heat-conducting relationship with the top wall of the uppermost hot-gas duct 14, the screws which mount the bracket in place are additionally employed to fasten a bow-spring 39 to the under side of the top wall of the casing, the lower part of the spring pressing downwardly against the bottom of the pan, as presented in Figures 3 and 4.

An upright tube 41, screwed at its upper end into a part 42 of the casing of the needle-valve structure, fits in an aperture through a bracket 43 fastened to the adjacent wall of the casing, and the tube is held in adjusted position in such part 43 by a set-screw 44.

At its lower end, inside of the collar or connection 32, the tube carries a rectangular frame 45, the lower open end of the tube extending through the top member of such frame.

A bi-metal, S-shaped thermostat 46 is fixedly mounted on the lower member of such frame and the upper portion of the thermostat is connected to the long shank 47 of the needle of valve 34, the thermostat, as shown, being positioned substantially in the center of the delivery collar or connection 32, where it is necessarily subjected to the temperature of the heated humidified air just as it leaves the conditioner.

The construction is such that the thermostat, through the needle-valve, modulates or regulates the supply of water to the heating pan, and this, of course, controls the amount of overflow onto the cascade device, whereby the water or moisture available for the humidifying effect is definitely and automatically governed and controlled by the temperature of the air which is to be delivered into the room or rooms.

Obviously, by adjusting the position of the tube 41 in the casing of the valve and in the stationary bracket 43, the action of the thermostat on the needle-valve may be changed or modified, allowing the valve 34 to start to open or pass water at any temperature desired from 35° F. to 200° F. The valve will be fully open at a temperature of, say, 35° F. higher than the temperature at which it first starts to pass water, and will allow an increasingly greater volume of water to flow from nothing at the start to full capacity at 35° F. higher temperature.

As has been indicated above, while the new air-conditioner is adapted for many satisfactory uses in various relations, it is primarily, though not restrictedly, intended to be associated with a furnace to which the heat is supplied intermittently as by the burning of gas, oil, powdered coal, or the like, the operation of the burner being controlled by a thermostat in the rooms or space heated by the furnace.

In connection with such discontinuously or interruptedly actuated fuel-burner, it is desirable that the air-conditioner shall not have the air pass therethrough until the heating-plant and the heat-exchanger become adequately heated by the hot flue-gases to insure proper stack action and to eliminate any possibility of cooling the flue-gases below their dew point temperature, and, accordingly, a thermostat 48 is located in the chamber 15 as illustrated in Figures 1 and 4, and such thermostat operates a mercury switch 49, shown diagrammatically only, in the circuit of the electric-motor, so that the circuit of the motor will be automatically closed when the flue-gas temperature reaches a definite point and will remain closed until the flue-gas temperature drops below this same predetermined temperature when the circuit will be automatically opened.

In addition, a side wall of plenum-chamber 19 is fitted with a damper 51 which may permit more or less of the air delivered by the fan to escape to the outside of the air-conditioner, if desired, thereby allowing less air to flow through the air passages 18.

The operation of the novel and improved appliance occurs practically as follows: The gas or oil burner, not shown, of the heating-plant or furnace, also not illustrated, as is common custom goes into operation automatically at some predetermined temperature by a thermostat located in the room, and the resulting products of combustion transmit a portion of their heat to such furnace, the hot flue-gases discharging from the heating-plant entering the improved air-conditioner through the connection 12 and leaving it through the connection 13, thereafter flowing to the stack or chimney, and, of course, in passing through our appliance, such hot gases necessarily flow through the plurality of ducts 14 of the heat-exchanger.

When the gas or oil burner first starts such operation, the heating-plant surfaces are relatively cold and most of the available heat in the combustion gases is removed thereby, and, accordingly, the flue-gases, relatively speaking, are cool.

As the gas or oil burner continues in its operation, the various surfaces of the furnace become progressively hotter to a definite limit, and thereafter the operation is maintained without much variation in the temperature of the various parts of the furnace.

Naturally, as the heating-plant gradually increases in temperature, the flue-gases continue to leave it at increasingly higher temperatures, and when the heating surfaces have reached their optimum temperature, the flue-gases will be at their greatest temperature and will continue discharging at approximately such temperature.

As the temperature of such flue-gases increases, the expansion element of the thermostat 48 will expand sufficiently to trip the well-known type of mercury-switch 48, completing the electric-circuit through the motor, thus initiating the operation of the motor and its fan. The purpose of this delayed start in the operation of the fan motor is to insure that sufficient heat is in the flue-gases for stack action before heat is extracted from the flue-gases and to insure against excessive condensation by not cooling these flue-gases below their dew-point temperature.

This thermostat will remain in its expanded condition as long as the flue-gases are above this definite temperature; or, in other words, during the operation of the gas or oil burner of the furnace and probably longer, as the electric-motor and its fan will revolve after this predetermined temperature of the flue-gas is once attained.

The fan during its action draws the air from the basement where the heating-plant is located, or from the space humidified, or from the outside of the building, or from the recirculating or cold-air duct when the heating-plant is of the hot-air type, or from the hot-air discharge-hood of a furnace installation, or from any of the hot-air ducts in a furnace installation, or from any combination thereof, and delivers it into the plenum-space 19 from which it flows through the air-ducts 18, alternating with the flue-gas passages 14; the air thus heated encountering the water cascade and becoming humidified thereby in the mixing-chamber 21, and ultimately flowing from the appliance through the discharge-duct 32 where it acts on the thermostat 46 and then through any suitable type of conduit means to deliver it into any one particular room, or into any number of rooms, or into the cold-air return-conduit of a warm-air installation, or into the hot-air discharge-bonnet, or a warm-air duct of a warm-air furnace installation, or any combination thereof, depending upon the type of heating-plant employed and the convenience of installation.

Such air when thus blown over the heating surfaces of the ducts extracts heat from the flue-gases flowing through their closely adjacent passages, the temperature of the air entering the plenum-chamber 19 varying ordinarily from approximately 60° F. to 71° F., depending on its source of supply.

The temperature of the flue-gases entering the heat-exchanger varies in practically every installation or application anywhere from 250° F. to even 700° F. or even 800° F., and it is evident, that, where the flue-gas temperatures are too low, for example, 350° F. and below, the abstraction of its heat by the air flowing through the heat-transfer device may cool the gases to a temperature below that necessary to afford proper stack action.

If this be the case, the fuel-burner of the furnace can be so adjusted as to increase the stack temperature to that essential by changing the rate of gas or oil consumption, the air supply for combustion, or a combination of the two.

In this connection it should be noted that when the flue-gas temperatures at the entrance to the ducts 14 are referred to, reference is made to the optimum temperature after the heating surfaces of the heating-plant or furnace have reached their maximum temperature.

The air in passing through the heat-exchanger from the plenum-space 19 to the entrance of the cascade-chamber 21 rises in temperature to 135° F. or more, but in any one particular installation the air volume, flue-gas volume and temperatures are constant, so that the leaving air temperatures will always be constant.

The air entering the cascade-chamber at, say, 135° F. is cooled adiabatically by the water of the cascade, the air leaving the humidifying-chamber at a lower temperature of, for example, 100° F. The air will leave the heating passages in some cases as high as 185° F. and then the adiabatic cooling in the humidifying stage will cool the air down to 150° F.

The total heat of the air, above 0° F., before and after leaving the cascade, is the same, because the water is heated by conduction in the pan 26 to the wet-bulb temperature of the air leaving the heat-exchanger and before its humidification.

The lowering of the sensible heat from a dry-bulb temperature of 135° F. to 100° F. represents the heat surrendered by the air to evaporate the water to raise the moisture-content of the air to a predetermined amount. The degree of adiabatic cooling will vary in each installation, depending on proper humidification requirements.

If, when this unit is installed, it is found that the necessary heat to be extracted from the flue-gases cools them to a temperature too low to afford the required stack or chimney action for proper operation of the heating-plant, or, if it is discovered that the flue-gases are below their dew-point temperature due to an insufficient volume of fuel consumed, it will be necessary to adjust the air-conditioner to rectify such condition, and, in this case, the damper 51 may be opened slightly to allow a portion of the air in the plenum-chamber to be discharged back into the basement and a lesser quantity of air will therefore be blown over the heating surfaces.

The still air in the air-conditioner at the thermostat 46 assumes the basement temperature before the fuel-burner of the furnace is automatically started, and, at this temperature, such thermostat is in a contracted state and the water needle-valve is closed, precluding flow therethrough to the heating pan.

When the furnace fuel-burner is automatically lighted, the temperature of the flue-gases gradually increases until the thermostat 48 functions to start the fan-motor and thereupon the air is forced over the heating surfaces of the exchanger and its dry-bulb temperature rises from the air-inlet temperature at the start, to say 135° F., when the optimum flue-gas temperature has been reached at the discharge of the heating-plant.

The temperature of the air rises by degrees at the discharge end of the heat-exchanger, and the heated air passes through the cascade which is dry.

Such air then passes through the mixing-chamber 21 and past the thermostat 46, and, as the air becomes warmer, due to the increased temperature of the flue-gases, it acts on the thermostat until, at a predetermined and adjustable temperature, the thermostat opens the water needle-valve allowing a trickle of water to flow therethrough into the pan and from thence onto the top of the cascade where it cataracts back and forth on the surface of the cascade-screen and the excess drops to the bottom, flowing out through the drain to the sewer line.

Such small amount of water over the cascade cools the heated air leaving the heating surfaces of the exchanger adiabatically by only a small amount.

The flue-gases continue to rise toward their optimum temperature, thus heating the air more and more until its maximum temperature is reached.

With a constant volume of air blown over the heating surfaces of the heat-exchanger and a constant dry-bulb temperature of the air leaving such heat-exchanger, it is evident, that, if the temperature of the air leaving the cascade is controlled, the depression of the dry-bulb temperature of the air passing over the cascade will also be governed, and likewise the amount of sensible heat given up by the air available for the evaporation of water for humidification of the air is also controlled.

By adjusting the needle-valve, the volume of water flowing over the cascade may be regulated, and this quantity in turn will control the dry-bulb depression of the air, as the greater the contact between the air and the water and the nearer the air will leave the water-cascade in a saturated condition of equal dry-bulb and wet-bulb temperatures.

If the dry-bulb temperature of the air leaving the cascade rises after final adjustment has been made, the thermostat will retract the needle-valve still further from its seat, allowing more water over the cascade.

If the temperature of the air drops below 100° F., this is an indication that too much water is flowing over the cascade, and such lower dry-bulb temperature of the air will cool the thermostat causing the needle-valve to close slightly, hence decreasing the volume of water over the cascade.

By having a constant moisture-content in the air supply to the fan and a uniform volume of air flowing and by heating this air to an unvarying temperature of 135° F. and then cooling the air adiabatically from such temperature to a predetermined temperature, for example, 100° F., there will be a uniform rate of moisture added to the air which passes into the room or rooms to be humidified.

The humidifying effect of the air leaving the air-conditioner is that moisture-content in the air over that in an equal weight of air at the same dry-bulb temperature and relative humidity maintained in the room or rooms.

The operation just described will continue until such time as the thermostat in the room or rooms shuts off the fuel-burner of the furnace, but, the air-conditioner will continue to function thereafter, as experience has established that the various surfaces of the heating-plant or furnace retain a considerable amount of heat and this continues to flow to the stack.

Therefore, the air-condtioner will not cease to function until the flue-gases are cooled to such a temperature, for example, 250° F., that their passage over the element 48 will contact the latter and trip the mercury-switch, thereby stopping the motor and fan, and the entire air-conditioner will thereupon remain idle until the thermostat in the room or rooms again automatically cuts in the fuel-burner and the specified cycle will then be repeated.

When the unit has been shut down due to the action of the thermostat 48, the thermostat 46 gradually cools off allowing the water-valve to close, and under usual operating conditions, when the air has cooled to a temperature of say 80° to 90° F., the needle-valve is so regulated that it will be entirely closed.

This description of the operation of the various parts of the improved combined heater and humidifier indicates, that, while the air-conditioner is in action, it automatically controls the humidification of the air passing through it in the sense that a constant weight of water-vapor is being added to a constant weight of air flowing through the unit, and, it naturally follows that a constant weight of water-vapor is being added to the air of such room or rooms while the fuel-burner of the furnace is in action.

The heat loss in the rooms to be humidified is in direct proportion to the outside temperature; or, stated differently, if the fuel-burner runs 100% of the time when the outdoor temperature is 0° F. and does not operate at all when such temperature is 65° F., it is obvious that, when the outside temperature is 32½° F., the burner will run 50% of the time, and when the temperature is 16¼° F. it will operate 75% of the time.

Considering the outdoor condition as with a normal wind speed, with the operating periods of the fuel-burner of the furnace in direct proportion to the outside temperature, the weight of water-vapor added to the rooms by the air-conditioner will also be in direct ratio to such external temperature.

Under standard or usual wind-velocity conditions, the air infiltration in any particular installation will be substantially constant. At 0° F. the infiltrated air to the heated and humidified rooms contains about 4 grains of moisture per pound, and at 60° F. the infiltrated air contains about 55 grains of moisture per pound, it having been discovered that the water-content of the infiltrated air from the outside does not vary in direct proportion to the outdoor temperature but rather increases rapidly with an ascending temperature.

The requirements for humidifying the infiltrated air at low temperatures are greater than at high temperatures.

Practice and experience have demonstrated that it is desirable to keep a constant dry-bulb temperature in the rooms with a relative humidity of 50% when the outdoor temperatures are high and to diminish such relative humidity down to 35% when the outdoor temperatures are around 0° F., but, of course, these percentages of relative humidity vary with the structure of the various buildings in which the humidification is supplied.

From what precedes it should be apparent that, if a humidostat is installed in the rooms to maintain the relative humidity, such instrument should be set for a different percentage of relative humidity for each outside temperature ranging from about 50% relative humidity at 65° F. outdoors down to 35% relative humidity at 0° F., if we are to eliminate the possibilities of undue or excessive condensation on the outside walls or window-panes, and one of the outstanding objects of the present invention is to accomplish this result automatically without the use of a humidostat or by manual adjustment.

With the improved air-conditioner supplying water-vapor to the rooms at a rate directly proportional to the outdoor temperature, over an extended period of time, and the infiltrated air (which is the cause for the need of humidification) having a moisture-content of an increasing amount (from 4 grains per pound at 0° F. to 55 grains per pound at 60° F.) it is evident that the humidifying effect in the rooms is the total grains of moisture added by this conditioner less the amount of moisture necessary to raise this same air to the desired relative humidity for the living quarters. This excess moisture is sufficient to raise the comparatively dry infiltrated air to the relative humidity of the room or rooms, such requirement being greatest when the outdoor temperature is low and increasingly less as such external temperature rises.

The outside air has practically eleven times more water-vapor in it at 60° F. than it has at 0° F., and it has five and one-half times as much at 35° F., and, accordingly, if the air-conditioner is adjusted to maintain a condition at 35% relative humidity with an outside temperature of 0° F., the relative humidity in the rooms will increase from the 35% at 0° F. to 51% at 60° F. outside air, due to the fact that air at 60° F. contains fifty-one more grains of moisture per pound than it contains at 0° F.

The purpose of the water-pan 26 is to preheat the water supply from the city water temperature to aproximately that of the wet-bulb temperature of the air leaving the heat-exchanger, which will vary for different installations, depending on the flue-gas temperature and the volume of flue gases.

By varying the height of the top of the water-spillway of such pan, it is possible to regulate the period of time during which each volume of water is held in the pan, and this, of course, determines the heat imparted thereto by conduction, and, in this manner, adjustments may be made so that the water leaving the pan is at the same temperature as the wet-bulb temperature of the air leaving the heating surface of the heat-exchanger and entering the cascade.

It is also within the scope of this invention to so arrange the automatic starting and stopping of the fan by wiring it in series with the electric solenoid valve or mercury-switch which initiates and terminates the operation of the fuel-burner, this arrangement of parts being a substitute for the employment of the thermostatically-controlled fan-switch.

The air movement through the air-conditioner can be brought about by means of a fan drawing the air through the appliance or by blowing air through it, or the air may be caused to flow through the conditioner by the action of gravity, but the preferred embodiment of the invention is that shown and described in which the air blown through the conditioner creates a slight pressure therein, thereby preventing any possibility of admitting any of the flue-gases into the humidified air which is to flow into the living quarters.

In the particular incorporation of the invention in physical form, a water-cascade means has been shown and described, but a comparable effect may be accomplished by a considerable number of different designs of cascades, film-evaporators, screens, or spray-nozzles, although the cascade as shown is preferable because of its dependability.

Obviously, this air heater and humidifier may be equipped with its own heater in place of the economizer arrangement illustrated.

To those skilled in this art it will be apparent that the invention is not limited and restricted to the precise details of construction illustrated and described and that modifications, minor or major, may be incorporated therein without departing from the principles underlying the invention and without the loss or sacrifice of any of its substantial benefits and advantages.

We claim:

1. In an air-conditioner, the combination of a heat-exchanger having means for the heating thereof and means for the passage of air therethrough, means to cause a flow of air through said exchanger to be heated thereby, means to humidify the air after such heating, means to supply the humidifying-medium to said humidifying means, and a thermostat under the influence of the heated humidified air as it leaves the conditioner regulating the action of said humidifying-medium supplying-means.

2. The structure presented in claim 1 in which the humidifying-medium is water and in combination with means to heat the water before it is supplied to the humidifying means to substantially the wet-bulb temperature of the heated air before its humidification.

3. The construction presented in claim 1 in combination with a thermostat subjected to the heat of the heating-medium of said heat-exchanger and governing the operation of said air-flow means.

4. The structure presented in claim 1 in which the humidifying-medium is water and in combination with means to heat the water before it is supplied to the humidifying means to substantially the wet-bulb temperature of the heated air before its humidification, and a thermostat under the influence of the heating-medium of said heat-exchanger controlling the operation of said air-flow means.

5. In an air-conditioner, the combination of a heat-exchanger having means for the heating thereof and means for the passage of air therethrough, means to cause a flow of air through said exchanger to be heated thereby, means to humidify the air after such heating, means to supply water to said humidifying means, means to heat the water before it is supplied to the humidifying means to substantially the wet-bulb temperature of the heated air before its humidification, a thermostat under the influence of the heated humidified air as it leaves the conditioner regulating the action of said water-supplying means, and a thermostat under the influence of the heating-medium of said heat-exchanger controlling the operation of said air-flow means.

ROBERT A. WITTMANN.
ROBERT G. GUTHRIE.